(12) United States Patent
Hidaka et al.

(10) Patent No.: US 11,472,042 B2
(45) Date of Patent: Oct. 18, 2022

(54) PICKING MECHANISM AND ROBOT ARM

(71) Applicant: THK CO., LTD., Tokyo (JP)

(72) Inventors: Kenji Hidaka, Tokyo (JP); Yuki Nomura, Tokyo (JP); Yoshikazu Matsuo, Tokyo (JP); Takaki Sakaguchi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 17/622,380

(22) PCT Filed: Jun. 11, 2020

(86) PCT No.: PCT/JP2020/023072
§ 371 (c)(1),
(2) Date: Dec. 23, 2021

(87) PCT Pub. No.: WO2020/262022
PCT Pub. Date: Dec. 30, 2020

(65) Prior Publication Data
US 2022/0203557 A1 Jun. 30, 2022

(30) Foreign Application Priority Data

Jun. 27, 2019 (JP) .............................. JP2019-119917

(51) Int. Cl.
*B25J 15/06* (2006.01)
*B25J 15/00* (2006.01)

(52) U.S. Cl.
CPC ....... *B25J 15/0052* (2013.01); *B25J 15/0608* (2013.01)

(58) Field of Classification Search
CPC .......................... B25J 15/0052; B25J 15/0608
(Continued)

(56) References Cited

U.S. PATENT DOCUMENTS

| 2,031,866 A * | 2/1936 | Thums ................... | B65D 71/50 294/87.24 |
| 2,398,747 A * | 4/1946 | O'Brien ................. | B65D 71/50 294/87.24 |

(Continued)

FOREIGN PATENT DOCUMENTS

| CN | 201901259 U | 7/2011 |
| CN | 207712379 U | 8/2018 |

(Continued)

OTHER PUBLICATIONS

International Search Report dated Aug. 25, 2020, issued in counterpart International Application No. PCT/JP2020/023072, w/English translation (4 ages).

(Continued)

*Primary Examiner* — Saul Rodriguez
*Assistant Examiner* — Brendan P Tighe
(74) *Attorney, Agent, or Firm* — WHDA, LLP

(57) ABSTRACT

In a picking mechanism for picking four or more columnar objects, when the plurality of objects have been picked, the objects are respectively held by holding member and supported by guide members while arranged on a base member in a plurality of rows, wherein a total sectional area of the guide members provided in regions of the base member that are each surrounded by circumferences of four circles serving as projections of four objects is smaller than a total sectional area of the guide members provided in regions of the base member that are each surrounded by one or two sides of a virtual rectangle, the virtual rectangle being formed so as to surround all of a plurality of circles serving as the projections of all of the plurality of objects while contacting the circumferences of the plurality of circles, and two or one of the projections.

3 Claims, 14 Drawing Sheets

(58) Field of Classification Search
USPC .................................................. 414/226.01
See application file for complete search history.

(56) References Cited

U.S. PATENT DOCUMENTS

| | | | |
|---|---|---|---|
| 2,437,667 A * | 3/1948 | Smith | B65D 71/50 |
| | | | 294/87.26 |
| 2,747,915 A * | 5/1956 | Mapes | B65D 71/50 |
| | | | 473/87 |
| 6,312,032 B1 | 11/2001 | Richardson | |

FOREIGN PATENT DOCUMENTS

| | | |
|---|---|---|
| DE | 227108 A1 | 9/1985 |
| DE | 4402610 A1 | 8/1995 |
| JP | 3-176313 A | 7/1991 |
| JP | 2000-128477 A | 5/2000 |
| JP | 2019-84656 A | 6/2019 |
| WO | 98/39213 A1 | 9/1998 |

OTHER PUBLICATIONS

Notice of Reasons for Refusal dated May 25, 2021, issued in counterpart JP Patent Application No. 2019-119917, w/English translation (8 pages).

Decision to Grant a Patent dated Aug. 3, 2021, issued in counterpart JP Patent Application No. 2019-119917, w/English translation (5 pages).

Office Action dated Apr. 26, 2022, issued in counterpart CN application No. 202080045898.8, with English translation. (15 pages).

Office Action dated Aug. 25, 2022, issued in counterpart DE application No. 112020003082.2, with English translation. (20 pages).

* cited by examiner

PICKING MECHANISM AND ROBOT ARM

TECHNICAL FIELD

The present invention relates to a picking mechanism for picking a columnar object, and to a robot arm.

BACKGROUND ART

PTL 1 discloses a technique relating to a transporter crane that travels along a travel rail, adsorbs a workpiece (a drum can) using an elevator mechanism that is raised and lowered by a hoisting device, and transports the workpiece. The elevator mechanism disclosed in PTL 1 includes an adsorption pad that opens downward in a central portion of an elevator frame so as to adsorb and hold the workpiece in the central portion, a workpiece stopper that is attached to a lower face of the elevator frame and joined to a top plate of the workpiece when the workpiece is adsorbed so as to prevent the workpiece from swinging, and a plurality of guide shafts that extend downward from the elevator frame and correct positional deviation in the workpiece when the workpiece is adsorbed by the adsorption pad so as to prevent the workpiece from swinging while the workpiece is raised and lowered by the pad.

CITATION LIST

Patent Literature

[PTL 1] Japanese Patent Application Publication No. 2000-128477

SUMMARY OF INVENTION

Technical Problem

An object of the present invention is to pick four or more columnar objects using a picking mechanism.

Solution to Problem

A picking mechanism according to the present invention is a picking mechanism for picking a plurality of objects constituted by four or more columnar objects, the picking mechanism including a base member, a holding member provided on the base member in a plurality so as to respectively hold upper face portions of the objects or parts thereof near the upper face portions, and a guide member provided on the base member in a plurality so as to respectively guide the objects to positions of the holding members and support the objects by contacting side faces of the objects, whereby, when the plurality of objects have been picked, the objects are respectively held by the holding members and supported by the guide members while arranged on the base member in a plurality of rows, wherein, when regions of the base member that are each surrounded by circumferences of four circles serving as projections of four objects arranged in two rows, among the plurality of objects, in a case where the plurality of objects in a picked state are projected onto the base member in an axial direction thereof are set as first regions, and regions of the base member that are each surrounded by any one or two sides of a virtual rectangle, the virtual rectangle being formed so as to surround all of a plurality of circles serving as the projections of all of the plurality of objects while contacting the circumferences of the plurality of circles, and the circumferences of any one or two of the plurality of circles in a case where the plurality of objects in the picked state are projected onto the base member in the axial direction thereof are set as second regions, the guide members are respectively provided in either the first regions or the second regions of the base member, and a total sectional area of parts of the guide member provided in one of the first regions that contact the side faces of the objects is larger than a total sectional area of parts of the guide member provided in one of the second regions that contact the side faces of the objects.

Advantageous Effects of Invention

According to the present invention, it is possible to pick four or more columnar objects using a picking mechanism.

DESCRIPTION OF EMBODIMENTS

Figure 1:
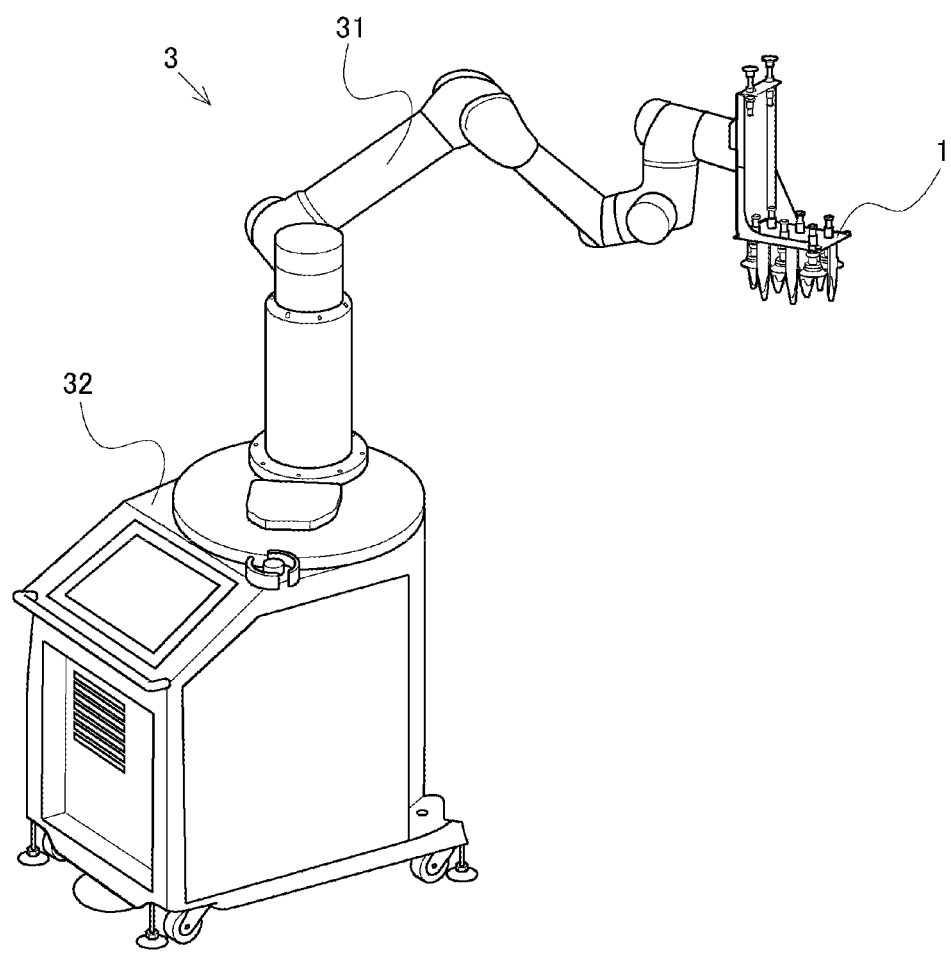
FIG. 1 is a schematic view showing a configuration of a robot arm according to a first embodiment.

A picking mechanism according to the present invention is a picking mechanism for picking a columnar object. Further, the picking mechanism according to the present invention picks a plurality of objects constituted by at least four objects.

The picking mechanism according to the present invention includes a base member, a holding member, and a guide member. The holding member is provided on the base member in a plurality. When the plurality of objects are picked by the picking mechanism, each of the holding members holds an upper face portion of an object or a part near the upper face portion. The guide member is also provided on the base member in a plurality. When the plurality of objects are picked by the picking mechanism, each of the guide members contacts a side face of an object so as to guide the object to a position in which the object can be held by the holding member. Further, by contacting the side face of the picked object, the guide member supports the object. Furthermore, the plurality of guide members are provided on the base member so that when the plurality of objects are picked by the picking mechanism according to the present invention, the plurality of objects are arranged in a plurality of rows on the base member. The positions in which the guide members are provided on the base member will be described in detail hereafter.

Having been picked by the picking mechanism, the plurality of objects are guided by the plurality of guide members so as to be arranged in a plurality of rows on the base member. In the picking mechanism, when the plurality of objects are set in this state, the upper surface portions of the respective objects or parts thereof near the upper surface portions are held by the holding members.

Further, when the picking mechanism picks the objects, the guide members not only guide the objects to the positions described above, but also support the objects. More specifically, when vibration is generated in the picking mechanism or the picking mechanism tilts in a state where the plurality of objects have been picked by the picking mechanism, the guide members support the objects by contacting the side faces of the objects.

By having the guide members support the objects in this manner, a moment centering on the holding members, which is generated in relation to the objects when the picking mechanism vibrates or tilts, can be reduced. As a result, it is possible to reduce a load that acts on the holding members while the holding members hold the objects.

Here, when the plurality of objects are projected onto the base member in an axial direction thereof in a state where the plurality of objects have been picked by the picking mechanism, circles in an identical number to the plurality of objects and having an identical diameter to the diameter of the plurality of objects are projected onto the base member as projections. At this time, a region surrounded by the circumferences of four circles serving as projections of four objects arranged in two rows, among the plurality of objects, is defined as a first region. Further, a rectangle formed so as to surround all of the aforesaid plurality of circles while contacting the circumferences of the plurality of circles is defined as a virtual rectangle. A region surrounded by any one or two sides of the virtual rectangle and the circumferences of any one or two of the plurality of circles forming the projections is defined as a second region. At this time, two types of regions occur as the second region, namely a region surrounded by any one side of the virtual rectangle and the circumferences of two circles, and a region surrounded by any two sides of the virtual rectangle and the circumference of one circle. Each guide member is provided on the base member in either the first region or the second region. Note that one guide member or a plurality of guide members may be provided in a single first region or a single second region.

The first region, as described above, is defined as a region surrounded by the circumferences of the four circles serving as the projections of four objects. Accordingly, four objects exist on the periphery of one first region. Therefore, the single guide member or the plurality of guide members provided in one first region support four objects. Meanwhile, the second region, as described above, is defined as a region surrounded by any one or two sides of the virtual rectangle and the circumference of the one circle serving as the projection of one object or the circumferences of the two circles serving as the projections of two objects. Accordingly, one or two objects exist on the periphery of one second region. Therefore, the single guide member or the plurality of guide members provided in one second region support one or two objects.

Hence, the number of objects supported by the single guide member or the plurality of guide members provided in one first region is larger than the number of objects supported by the single guide member or the plurality of guide members provided in one second region. Therefore, the guide members provided in one first region require greater durability than the guide members provided in one second region.

Hence, in the picking mechanism according to the present invention, a total sectional area of the parts of the guide members provided in one first region that contact the side faces of the objects is set to be larger than a total sectional area of the parts of the guide members provided in one second region that contact the side faces of the objects. Here, "the total sectional area of the parts of the guide members that contact the side faces of the objects" denotes the sum of the surface areas of the parts of the guide members that contact the side faces of the objects on a cross-section that is perpendicular to the axial direction thereof. Note that when only one guide member is provided in one first region or one second region, the total sectional area is the sectional area of the parts of the single guide member that contact the side faces of the objects. By providing the guide members in this manner, the guide members provided in one first region can be provided with greater durability than the guide members provided in one second region. As a result, durability can be secured in the guide members.

Hence, by providing the picking mechanism according to the present invention with the holding members and guide members described above, a plurality of objects constituted by at least four objects can be picked with stability. Moreover, durability can be secured in the guide members of the picking mechanism.

Specific embodiments of the present invention will be described below on the basis of the figures. Unless specified otherwise, the technical scope of the invention is not limited only to the dimensions, materials, shapes, relative arrangements, and so on of the constituent components described in these embodiments.

First Embodiment

Figure 2:
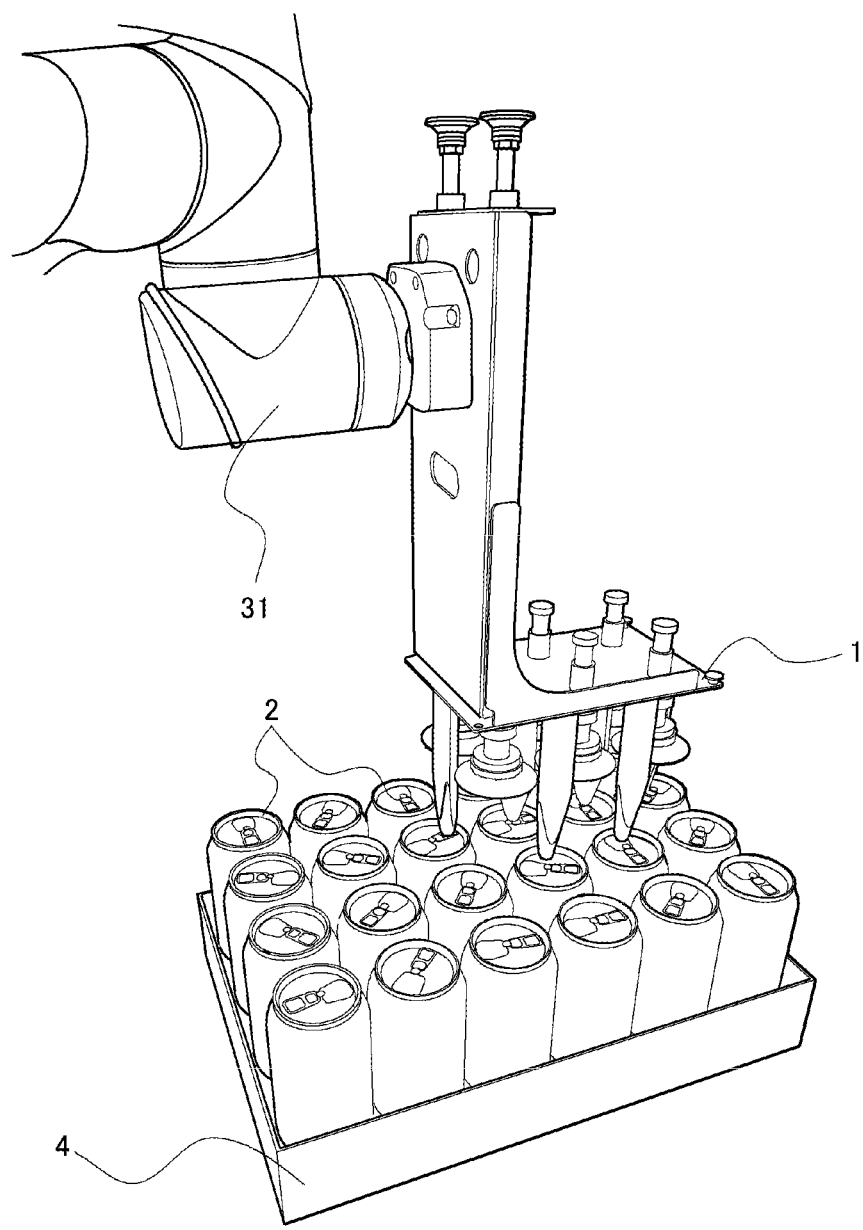
FIG. 2 is a schematic view showing an enlargement of a tip end portion of an arm mechanism and a picking mechanism according to the first embodiment.

Here, a case in which the picking mechanism according to the present invention is applied to a robot arm will be described. FIG. 1 is a schematic view showing a configuration of a robot arm 3 according to this embodiment. The robot arm 3 includes a picking mechanism 1, an arm mechanism 31, and a support portion 32. The picking mechanism 1 is connected to a tip end portion of the arm mechanism 31. Thus, the picking mechanism 1 can be moved by an operation of the arm mechanism 31 on the robot arm 3. Further, the support portion 32 is connected to the other end of the arm mechanism 31. A control device for controlling the arm mechanism 31 is built into the support portion 32. FIG. 2 is a schematic view showing an enlargement of the tip end portion of the arm mechanism 31 and the picking mechanism 1 according to this embodiment. In this embodiment, the object picked by the picking mechanism 1 is a columnar object such as a beverage can or a canned foodstuff. In this embodiment, a plurality of cans 2 serving as the objects are placed in a rectangular parallelepiped-shaped case 4 formed from cardboard and arranged in rows (in FIG. 2, 24 cans 2 are placed in the case 4). Note that an upper portion of the case 4 is open such that upper parts of the plurality of cans 2 are exposed. By operating the arm mechanism 31 on the robot arm 3, the plurality of cans 2 placed in the case 4 can be accessed from above.

(Picking Mechanism)

Figure 3:
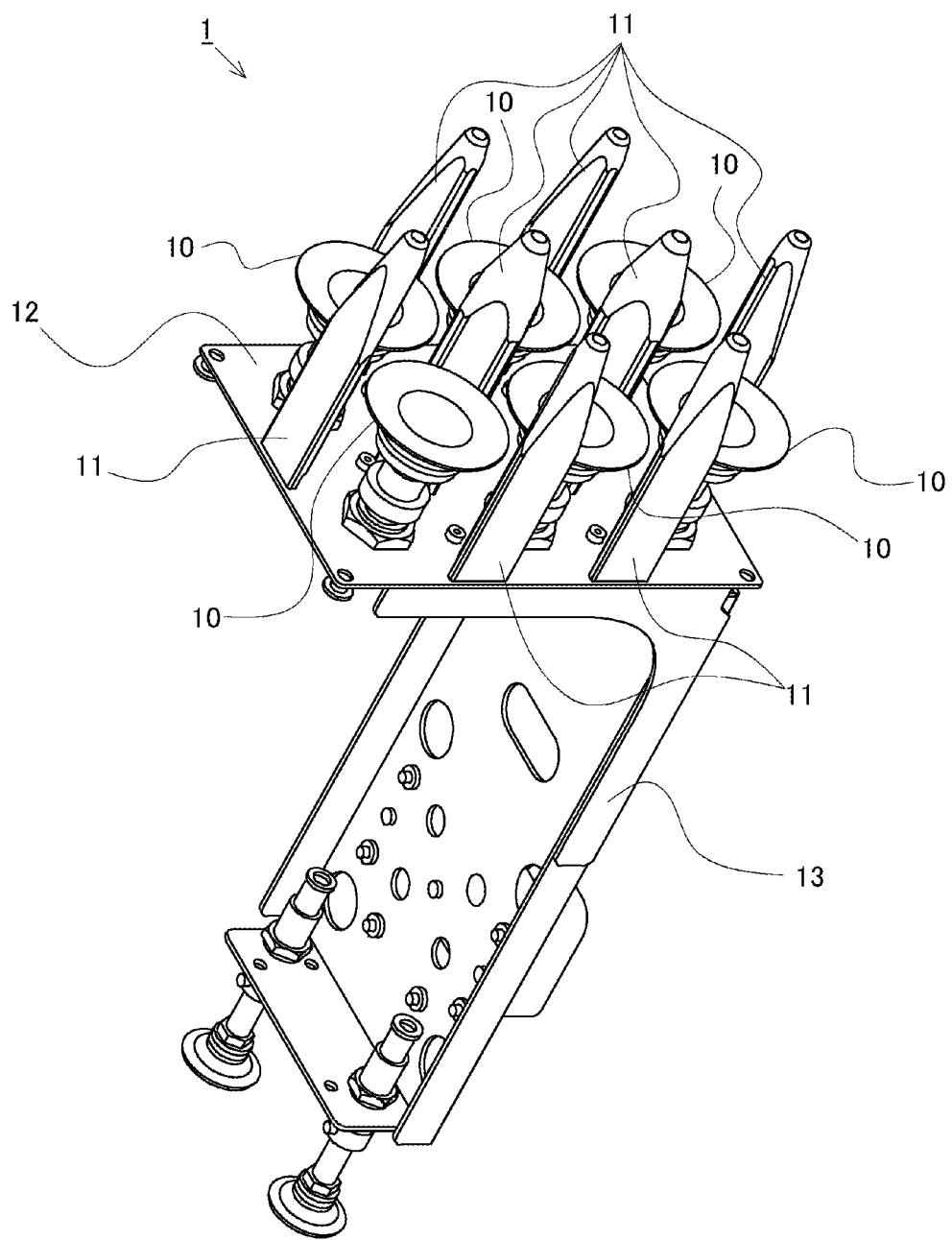
FIG. 3 is a perspective view of the picking mechanism according to the first embodiment.
Figure 4:
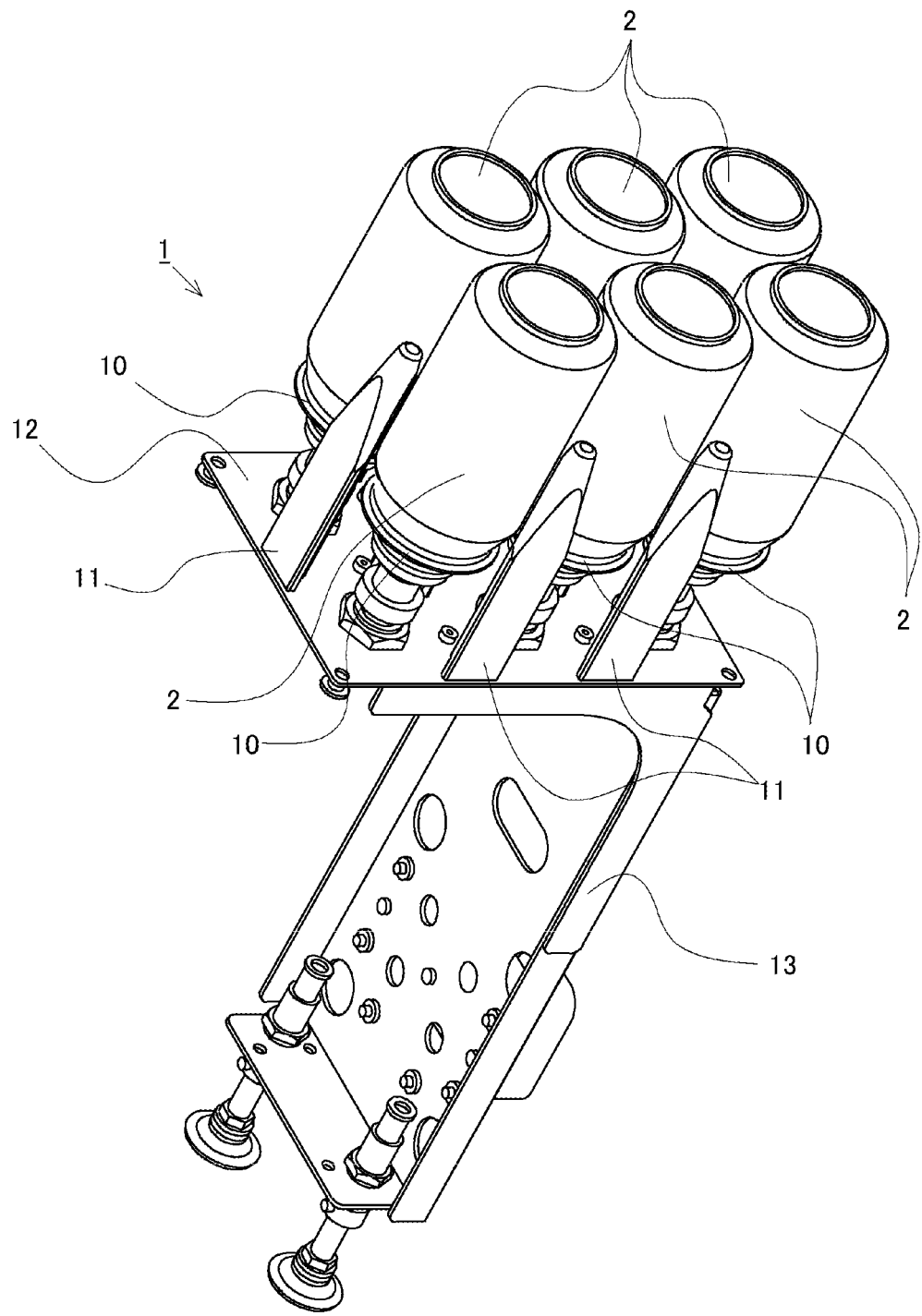
FIG. 4 is a perspective view of the picking mechanism and six picked cans according to the first embodiment.

Next, the configuration of the picking mechanism 1 will be described in detail on the basis of FIGS. 3 to 8. FIG. 3 is a perspective view of the picking mechanism 1 according to this embodiment. FIG. 4 is a perspective view of the picking mechanism 1 and six picked cans 2 according to this embodiment. As shown in FIG. 4, the picking mechanism 1 picks the six cans 2 simultaneously. The picking mechanism 1 includes an attachment member 13, a base member 12, six adsorption pads 10, and eight guide pins 11. The attachment member 13 is a member that is connected to the arm mechanism 31 when the picking mechanism 1 is attached to the tip end portion of the arm mechanism 31. Further, the adsorption pads 10 and the guide pins 11 are provided on the base member 12.

Figure 5:
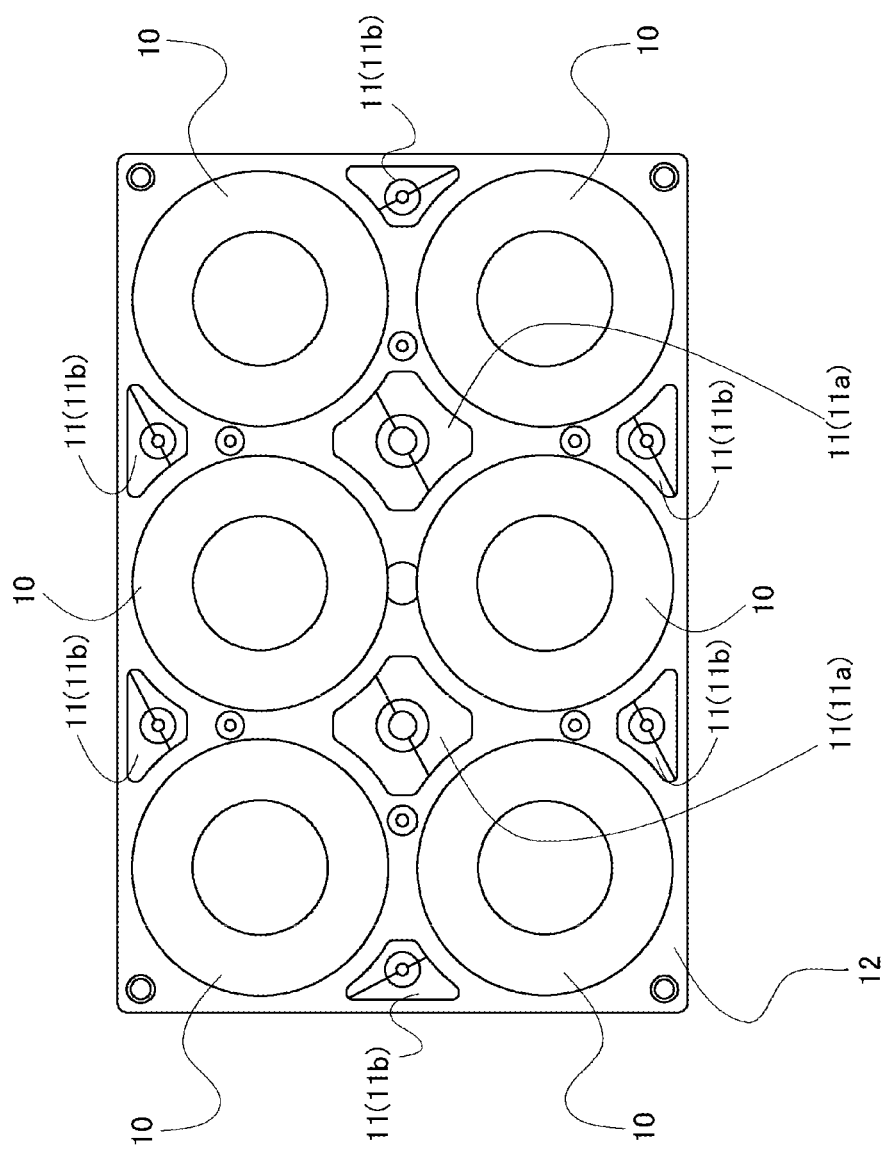
FIG. 5 is a view showing an arrangement of six adsorption pads and eight guide pins on a base member.
Figure 6:
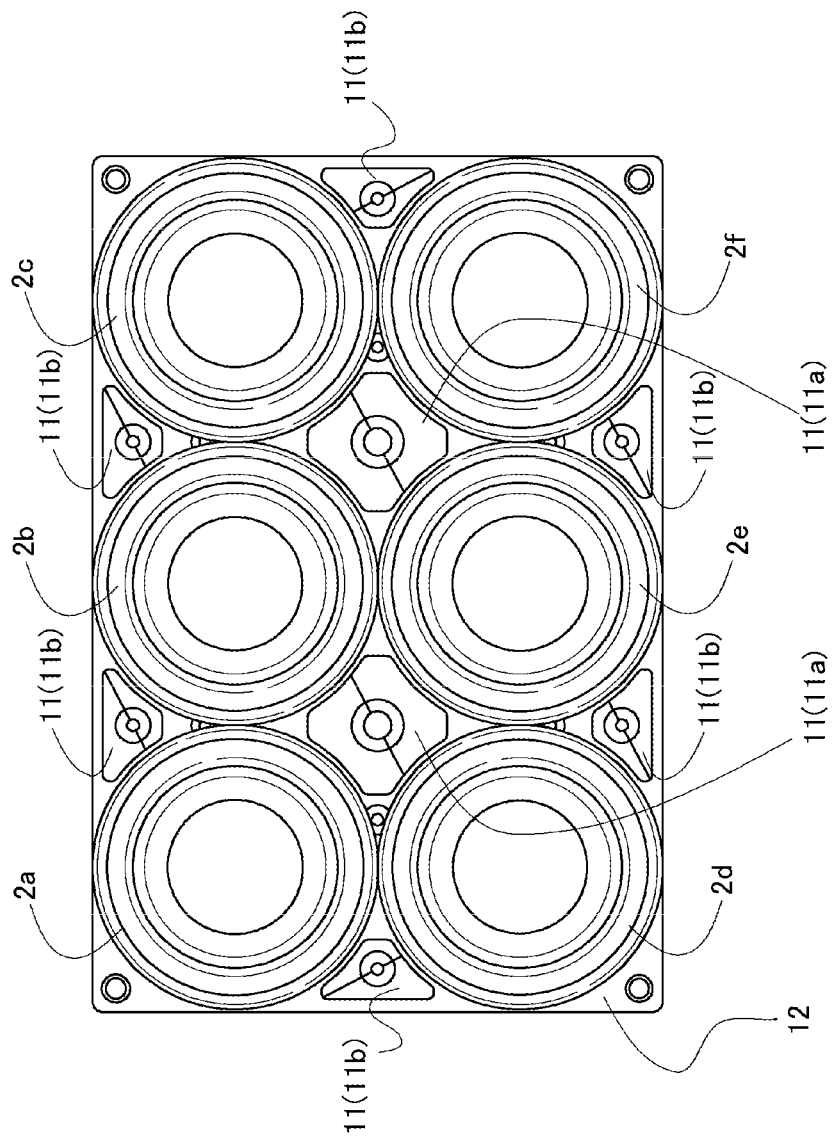
FIG. 6 is a view showing an arrangement of the eight guide pins and the six cans on the base member in a state where the six cans have been picked by the picking mechanism.

When the six cans 2 are picked by the picking mechanism 1, the cans 2 are arranged on the base member 12 in two rows and three columns. Further, in this embodiment, the six cans 2 arranged on the picking mechanism 1 in two rows and three columns are set such that the side faces of adjacent cans 2 contact each other. Note, however, that the cans 2 do not necessarily have to be arranged such that the side faces of adjacent cans 2 contact each other. FIG. 5 is a view showing an arrangement of the six adsorption pads 10 and the eight guide pins 11 on the base member 12. Further, FIG. 6 is a view showing an arrangement of the eight guide pins 11 and the six cans 2 on the base member 12 in a state where the six cans 2 have been picked by the picking mechanism 1. As shown in FIG. 5, the six adsorption pads 10 are provided at equal intervals on the base member 12 in two rows and three columns so as to be capable of holding respective upper face portions of the cans 2. In a state where the adsorption pads 10 respectively contact the upper face portions of the corresponding cans 2, spaces formed respectively by adsorption surfaces of the adsorption pads 10 and the upper faces of the cans 2 are set at negative pressure by a negative pressure mechanism (note that for convenience, illustration of the negative pressure mechanism has been omitted). Accordingly, the adsorption pads 10 are respectively adsorbed to the upper face portions of the cans 2. As a result, the six cans 2 serving as the picking subjects are respectively held by the corresponding adsorption pads 10. Thus, the picking mechanism 1 can pick the six cans 2 simultaneously. Here, the adsorption pad 10 according to this embodiment corresponds to the holding member of the present invention. Note, however, that in the present invention, the holding member is not limited to an adsorption pad. For example, the holding member may be a chuck device that holds a part of the can 2 near the upper face portion thereof by means of a chuck, a holding device that adsorbs and holds the upper face portion of each can 2 by magnetic force, and so on.

Further, as shown in FIG. 6, in a state where the six cans 2 have been picked by the picking mechanism 1, each of the guide pins 11 contacts the side faces of the cans 2 that are adjacent thereto. Thus, the guide pins 11 respectively guide the cans 2 to the positions of the corresponding adsorption pads 10 (in other words, positions in which the upper face portions of the cans 2 face the respective adsorption pads 10). Furthermore, by contacting the side faces of the picked cans 2, the guide pins 11 support the cans 2 that are adjacent thereto. Here, the guide pin 11 according to this embodiment corresponds to the guide member of the present invention.

Figure 7:
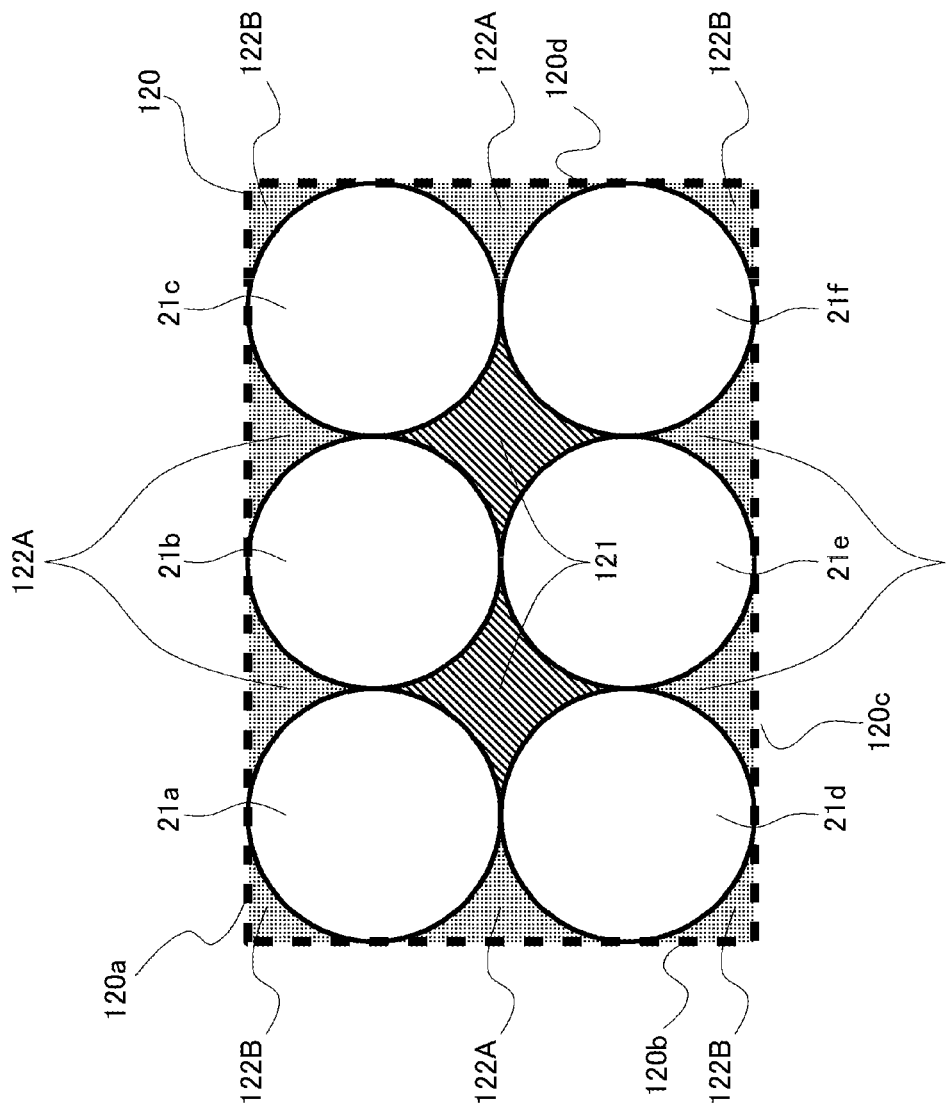
FIG. 7 is a view showing projections of the six cans projected onto the base member.

Next, the positions on the base member 12 in which the guide pins 11 are respectively provided will be described in detail. Note that hereafter, when the six cans 2 picked by the picking mechanism 1 are to be described individually, the cans 2 will be referred to as cans 2a to 2f. Here, as shown in FIG. 6, it is assumed that in a state where the six cans 2 have been picked by the picking mechanism 1, the six cans 2 are projected onto the base member 12 in the axial direction thereof. FIG. 7 is a view showing projections of the six cans 2 projected onto the base member 12 at this time. At this time, the projections of the cans 2a to 2f are set respectively as projections 21a to 21f. Here, the diameter of the can 2 and the diameter of each of the circles forming the projections are identical. As shown in FIG. 7, a region surrounded by the circumferences of four circles serving as the projections of four cans 2 arranged in two rows, among the six cans 2, is defined as a first region 121. In other words, a region surrounded by the projections 21a, 21b, 21d, 21e and a region surrounded by the projections 21b, 21c, 21e, 21f are each defined as the first region 121. Further, a rectangle such as that indicated by dotted lines in FIG. 7, which is formed so as to surround all of the six circles forming the projections of all of the six cans 2 while contacting the circumferences of the six circles is set as a virtual rectangle 120. Here, the virtual rectangle 120 is constituted by four sides 120a to 120d. As shown in FIG. 7, a region surrounded by any one or two sides of the virtual rectangle 120 and the circumferences of any one or two of the six circles is defined as a second region 122. At this time, two types of regions occur as the second region 122, namely a region (a second region 122A) surrounded by any one side of the virtual rectangle 120 and any two of the six circles, and a region (a second region 122B) surrounded by any two sides of the virtual rectangle 120 and any one of the six circles. In other words, a region surrounded by the side 120a of the virtual rectangle 120, the projection 21a, and the projection 21b, a region surrounded by the side 120a of the virtual rectangle 120, the projection 21b, and the projection 21c, a region surrounded by the side 120b of the virtual rectangle 120, the projection 21a, and the projection 21d, a region surrounded by the side 120c of the virtual rectangle 120, the projection 21d, and the projection 21e, a region surrounded by the side 120c of the virtual rectangle 120, the projection 21e, and the projection 21f, and a region surrounded by the side 120d of the virtual rectangle 120, the projection 21c, and the projection 21f are each defined as the second region 122A. Further, a region surrounded by the side 120a of the virtual rectangle 120, the side 120b of the virtual rectangle 120, and the projection 21a, a region surrounded by the side 120a of the virtual rectangle 120, the side 120d of the virtual rectangle 120, and the projection 21c, a region surrounded by the side 120b of the virtual rectangle 120, the side 120c of the virtual rectangle 120, and the projection 21d, and a region surrounded by the side 120c of the virtual rectangle 120, the side 120d of the virtual rectangle 120, and the projection 21f are each defined as the second region 122B.

As shown in FIGS. 5 and 6, on the base member 12, one guide pin 11 is provided in each first region 121 and each second region 122A. Further, guide pins 11 are not provided in the four second regions 122B (the regions formed respectively in the four corners of the virtual rectangle 120) on the base member 12. Note that hereafter, the guide pins 11 provided in the first regions 121 will also be referred to as first guide pins 11a. Further, the guide pins 11 provided in the second regions 122A will also be referred to as second guide pins 11b. Furthermore, each of the guide pins 11 is formed in a curved surface shape so that side faces thereof that oppose the adjacent cans 2 extend along the side faces of the cans 2.

Figure 8:
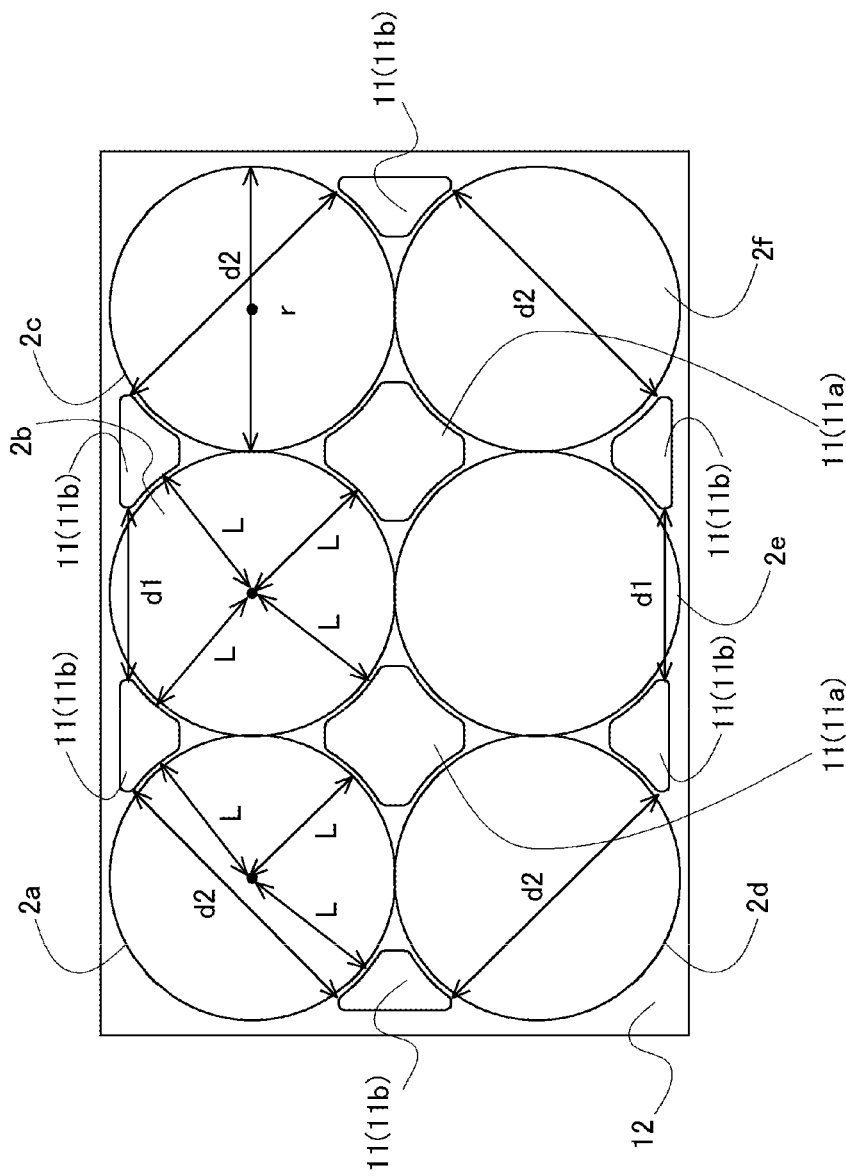
FIG. 8 is a view showing positional relationships between the guide pins and the six picked cans.

FIG. 8 is a view showing positional relationships between the guide pins 11 and the six picked cans 2. By providing the guide pins 11 in the first regions 121 and second regions 122A in the manner described above, the cans 2a, 2c, 2d, 2f are each adjacent to one first guide pin 11a and two second guide pins 11b, and the cans 2b, 2e are each adjacent to two first guide pins 11a and two second guide pins 11b. On the base member 12, a distance L between a central axis of each can 2 and the side face of each adjacent guide pin 11 is slightly larger than half the outer diameter r of the can 2. Thus, the cans 2 are respectively guided to the positions of the corresponding adsorption pads 10 by the guide pins 11 adjacent thereto. Further, by bringing the side faces of the cans 2 into contact with the side faces of the guide pins 11, the cans 2 are supported by the guide pins 11 adjacent thereto. Hence, when the six cans 2 are picked by the picking mechanism 1, the cans 2 are held by the adsorption pads 10 and supported by the guide pins 11 so as to be arranged on the base member 12 in two rows and three columns and such that the side faces of adjacent cans 2 contact each other.

Furthermore, on the base member 12, a minimum distance d1 between the two second guide pins 11b adjacent to the can 2b is smaller than the outer diameter r of the can 2. Moreover, this applies likewise to the two second guide pins 11b adjacent to the can 2e. Further, on the base member 12, a minimum distance d2 between the two second guide pins 11b adjacent to the can 2a on the outside of the central axis of the can 2a (in FIG. 7, on the side of the second region 122B surrounded by the projection 21a of the can 2a, the side 120a of the virtual rectangle 120, and the side 120b of the virtual rectangle 120) is smaller than the outer diameter r of the can 2. Moreover, this applies likewise to the two second guide pins 11b respectively adjacent to the cans 2c, 2d, 2f. By configuring and arranging the second guide pins 11b in this manner, the cans 2 can be prevented from slipping out between two adjacent second guide pins 11b. As a result, the picked cans 2 are less likely to fall out of the picking mechanism 1.

Figure 9:
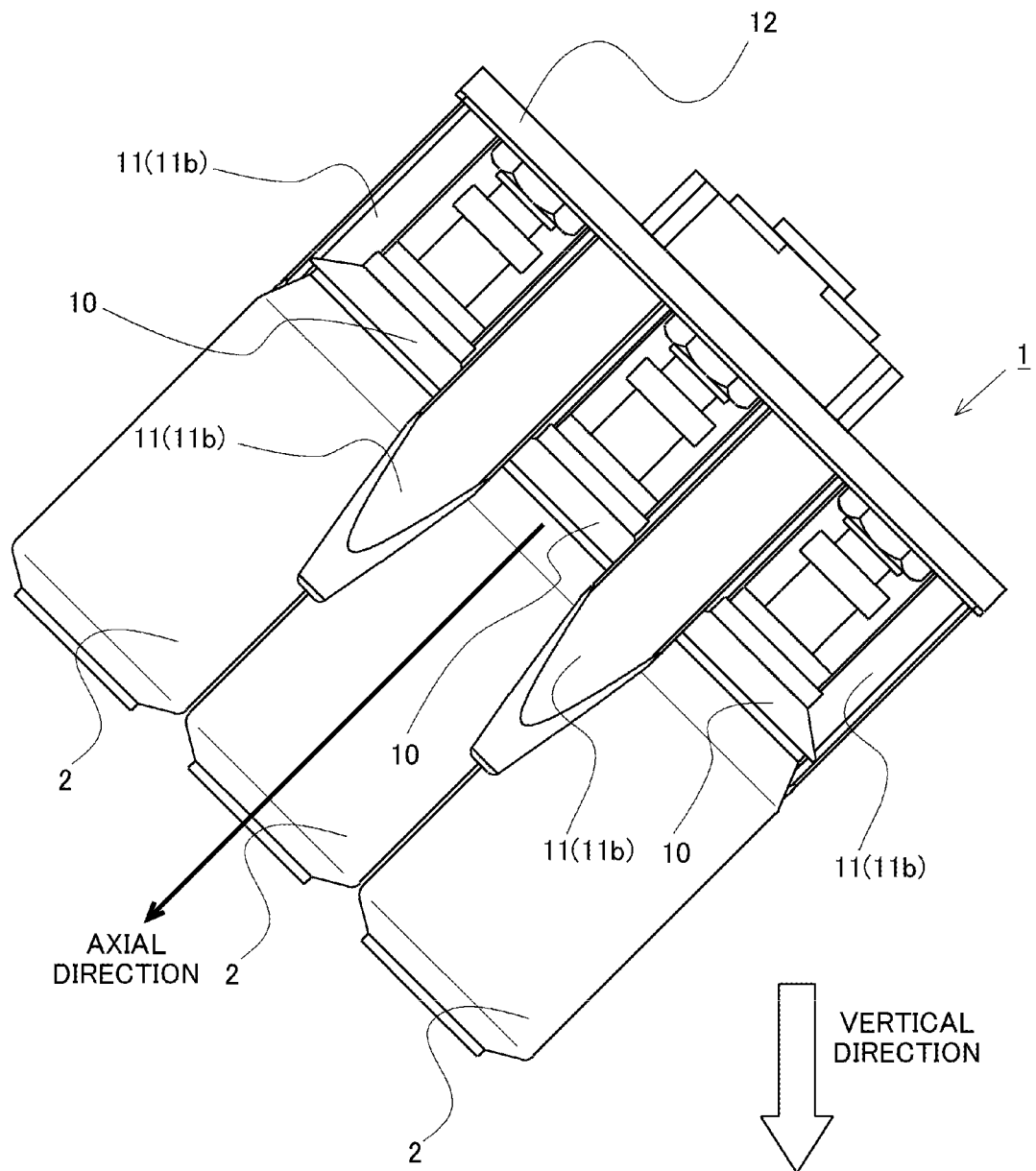
FIG. 9 is a view showing the picking mechanism in a tilted state in a state where the six cans have been picked by the picking mechanism.

Furthermore, by contacting the side faces of the cans 2, the guide pins 11 support the cans 2 adjacent thereto. When the cans 2 are picked by the picking mechanism 1, the picking mechanism 1 may vibrate, causing force (inertial force) to act on the cans 2 in a different direction to the axial direction of the cans 2. Moreover, in a state where the cans 2 have been picked by the picking mechanism 1, the picking mechanism 1 may tilt. FIG. 9 is a view showing the picking mechanism 1 in a tilted state in a state where the six cans 2 have been picked by the picking mechanism 1. A black-outlined arrow in FIG. 9 represents a vertical direction. Further, an arrow in FIG. 9 indicates the axial direction of the cans 2. When the picking mechanism 1 tilts in a state where the cans 2 have been picked by the picking mechanism 1, gravitational force acts on the cans 2 picked by the picking mechanism 1 in the vertical direction, which is a different direction to the axial direction of the cans 2. Note that likewise when the case 4 in which the plurality of cans 2 serving as the picking subjects are placed, as shown in FIG. 2, is disposed on an inclined surface, the picking mechanism 1 tilts in the manner shown in FIG. 9 during picking of the six cans 2 from the case 4 by means of the picking operation of the picking mechanism 1, to be described below.

Hence, when the picking mechanism 1 vibrates or tilts in a state where the six cans 2 have been picked by the picking mechanism 1, force acts on the cans 2 picked by the picking mechanism 1 in a different direction to the axial direction of the cans 2. In such a case, a moment centering on the adsorption pad 10 holding the upper face portion of each can 2 is generated in each can 2. At this time, however, the guide pins 11 contact the side faces of the cans 2, and therefore the cans 2 receive a reaction force from the guide pins 11 contacting the side faces thereof. Accordingly, the moment generated in each of the cans 2 about the adsorption pad 10 can be reduced. As a result, the load exerted on the adsorption pads 10 holding the cans 2 can be reduced. Therefore, even when force acts on the cans 2 in a different direction to the axial direction of the cans 2, the cans 2 can be prevented from becoming detached from the adsorption pads 10. Thus, the six cans 2 can be picked by the picking mechanism 1 with stability.

Furthermore, as described above, the first region 121 shown in FIG. 7 is defined as a region surrounded by the circumferences of four circles serving as the projections of four cans 2 arranged in two rows, among the six cans 2. Therefore, when the six cans 2 are picked by the picking mechanism 1, the first guide pin 11a provided in the first region 121 is adjacent to four cans 2. More specifically, the first guide pins 11a provided in the two first regions 121 are adjacent to the cans 2a, 2b, 2d, 2e and the cans 2b, 2c, 2e, 2f, respectively. Hence, when the six cans 2 are picked by the picking mechanism 1, the first guide pins 11a provided in the two first regions 121 are each required to support four cans 2. Meanwhile, as described above, the second region 122A shown in FIG. 7 is defined as a region surrounded by any one side of the virtual rectangle 120 and any two of the six circles serving as the projections of the six cans 2. Therefore, when the six cans 2 are picked by the picking mechanism 1, the second guide pins 11b provided respectively in the six second regions 122A are each adjacent to two cans 2. More specifically, the second guide pins 11b provided in the six second regions 122A are adjacent to the cans 2a, 2b, the cans 2b, 2c, the cans 2a, 2d, the cans 2d, 2e, the cans 2e, 2f, and the cans 2c, 2f, respectively. Hence, when the six cans 2 are picked by the picking mechanism 1, the second guide pins 11b provided in the six second regions 122A are each required to support two cans 2.

Thus, the number of cans 2 supported by the first guide pin 11a (the single first guide pin 11a) provided in each first region 121 is larger than the number of cans 2 supported by the second guide pin 11b (the single second guide pin 11b) provided in each second region 122A. Therefore, the first guide pins 11a provided in the first regions 121 require greater durability than the second guide pins 11b provided in the second regions 122A.

Hence, in the picking mechanism 1 according to this embodiment, as shown in FIGS. 5, 6, and 8, the sectional areas of the parts of the first guide pins 11a provided in the first regions 121 that contact the side faces of the respective cans 2 are set to be greater than the sectional areas of the parts of the second guide pins 11b provided in the second regions 122A that contact the side faces of the respective cans 2. In other words, the sectional area of the parts of the first guide pin 11a supporting four cans 2 that contact the side faces of the cans 2 is set to be greater than the sectional area of the parts of the second guide pin 11b supporting two cans 2 that contact the side faces of the cans 2. Here, "the sectional area of the parts of the guide pin 11 that contact the side faces of the cans 2" denotes the surface area of the parts of the guide pin 11 that contact the side faces of the cans 2 on a cross-section that is perpendicular to the axial direction thereof. By configuring the first guide pins 11*a* and second guide pins 11*b* in this manner, the durability of the first guide pins 11*a* can be made greater than the durability of the second guide pins 11*b*. As a result, durability can be secured in each of the guide pins 11.

(Picking Operation)

Figure 10:
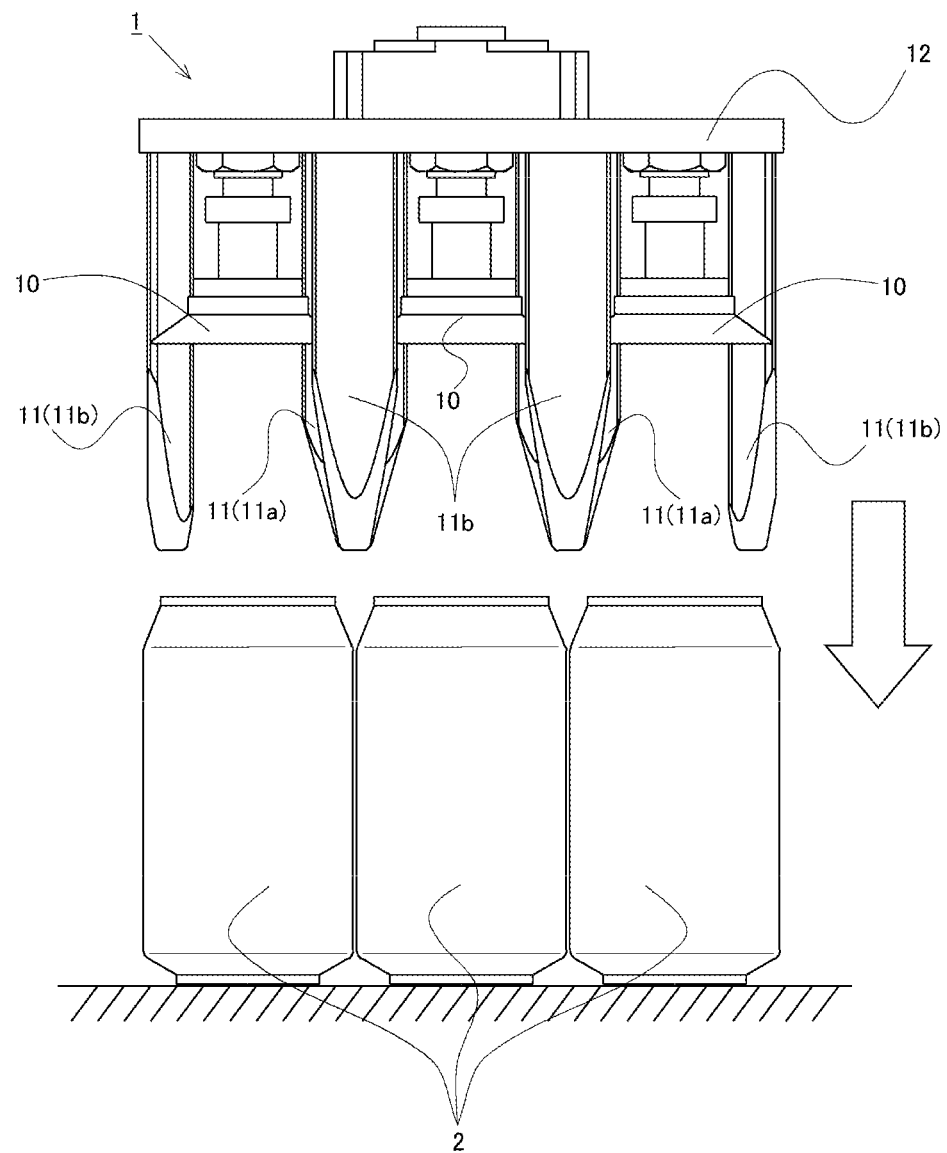
FIG. 10 is a view showing a picking operation performed by the picking mechanism.
Figure 11:
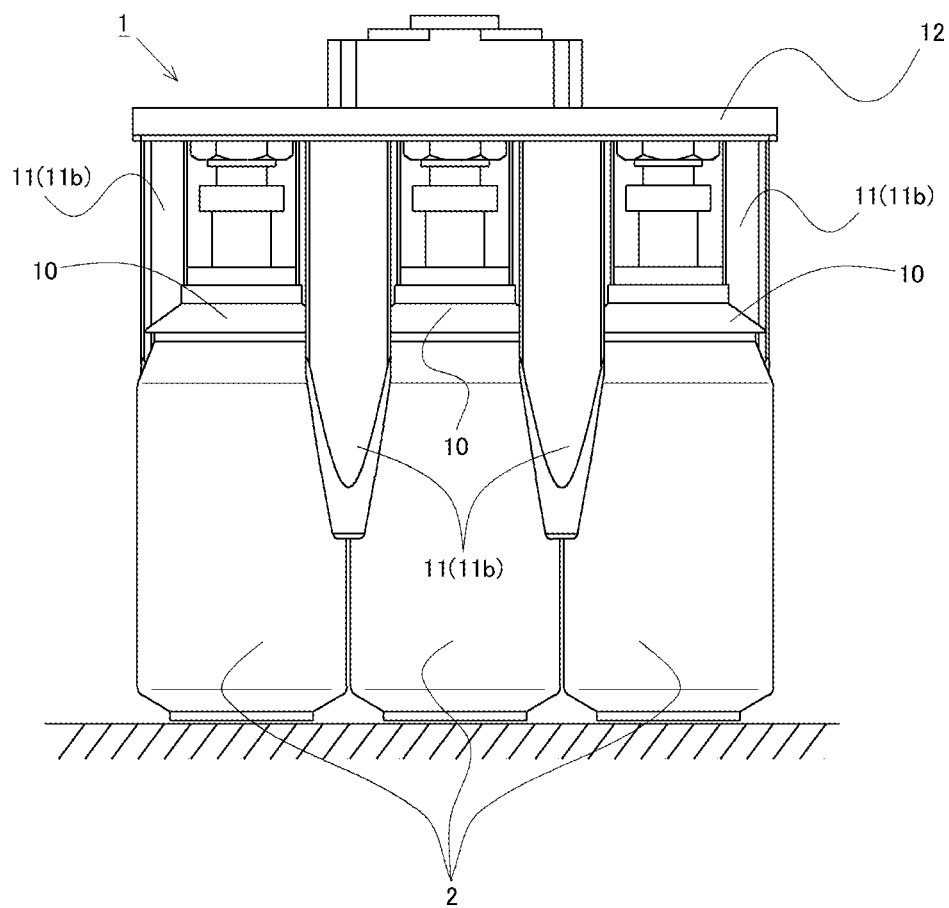
FIG. 11 is a view showing the picking operation performed by the picking mechanism.

In this embodiment, as described above, the attachment member 13 of the picking mechanism 1 is connected to the tip end portion of the arm mechanism 31. Further, the arm mechanism 31 is controlled by the control device provided in the support portion 32. The arm mechanism 31 can thus be moved by the control device provided in the support portion 32. Accordingly, the picking mechanism 1 can be moved. FIGS. 10 and 11 show the picking operation performed by the picking mechanism 1. In the picking operation, first, as shown in FIG. 10, the picking mechanism 1 is moved above the six cans 2 serving as the picking subjects by controlling the arm mechanism 31. Next, the picking mechanism 1 is moved downward (in the direction of a black-outlined arrow in FIG. 10) in the axial direction of the cans 2 by controlling the arm mechanism 31. At this time, the guide pins 11 are inserted into gaps formed by the six cans 2 serving as the picking subjects and either other cans positioned on the periphery thereof or inner walls of the case 4. At this time, by bringing the respective guide pins 11 into contact with the side faces of the adjacent cans 2, the cans 2 are guided to the positions of the corresponding adsorption pads 10. As a result, the six cans are arranged in two rows and three columns and such that the side faces of adjacent cans 2 contact each other. Then, as shown in FIG. 11, when the adsorption pads 10 respectively contact the upper face portions of the corresponding cans 2, spaces formed by the adsorption surfaces of the adsorption pads 10 and the upper faces of the cans 2 are set at negative pressure by a negative pressure mechanism, as described above. As a result, the adsorption pads 10 are respectively adsorbed to the upper face portions of the cans 2. Thus, the six cans 2 serving as the picking subjects are respectively held by the corresponding adsorption pads 10. By performing this series of picking operations, six cans can be picked simultaneously by the picking mechanism 1 from among the plurality of cans 2 placed in the case 4.

Note that in this embodiment, as described above, the guide pins 11 are provided in the six second regions 122A on the base member 12 but not provided in the four second regions 122B on the base member 12. Note, however, that guide pins for respectively guiding the cans 2 to the positions of the corresponding adsorption pads 10 and supporting the cans 2 by contacting the side faces of the adjacent cans 2 may also be provided in the second regions 122B on the base member 12.

Figure 12:
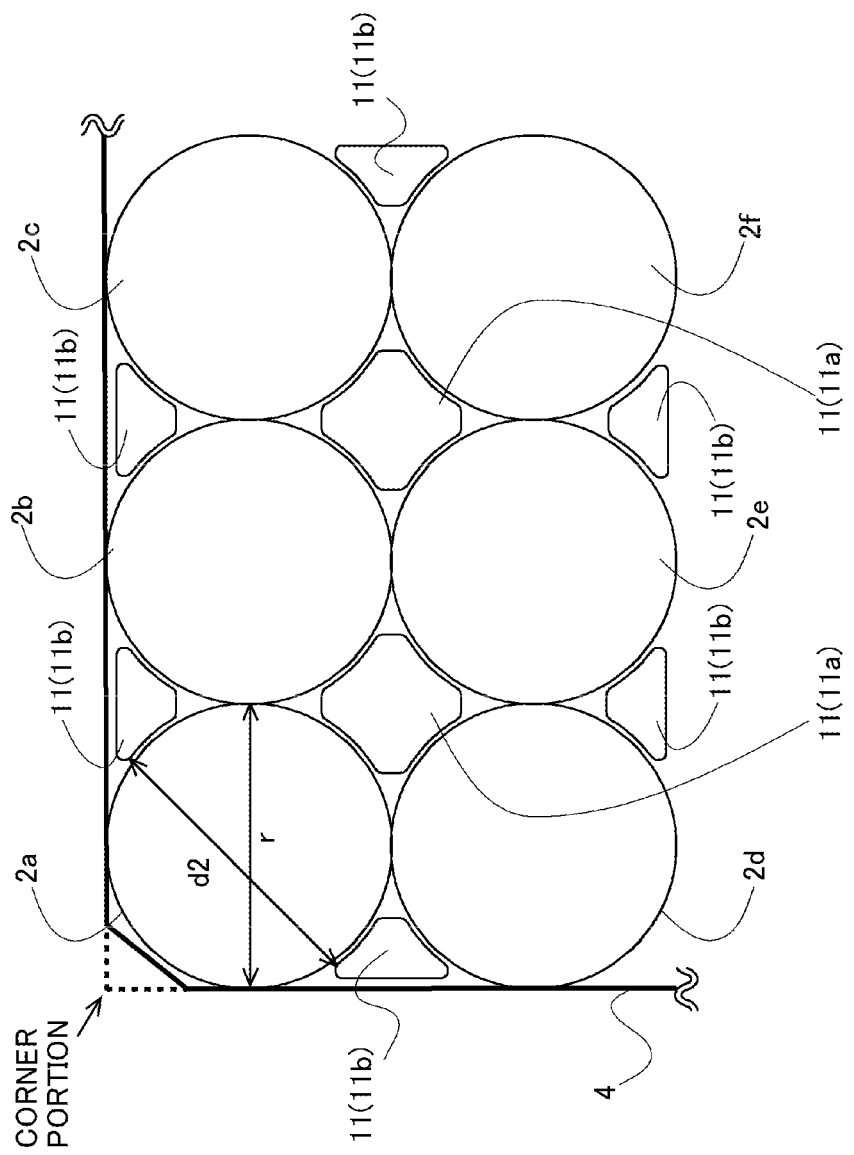
FIG. 12 is a view showing six cans 2 placed in a case 4 near a corner portion of the case 4.

In this embodiment, however, as shown in FIG. 2, the plurality of cans 2 are placed in rows in the rectangular parallelepiped-shaped case 4, which is formed from cardboard. At this time, six cans 2 placed in the case 4 near a corner portion of the case 4 may be picked by the picking mechanism 1. FIG. 12 shows six cans 2 placed in the case 4 near a corner portion of the case 4 in this manner. When an attempt is made to pick the six cans 2 placed near the corner portion of the case 4, as shown in FIG. 12, if guide pins are also provided in the second regions 122B on the base member 12 of the picking mechanism 1, during execution of the picking operation described above, the guide pin provided in the relevant second region 122B is inserted into a gap formed by the corner portion of the case 4 and the can 2*a*. As shown in FIG. 12, however, the corner portions of the case 4 may be deformed by an impact during transportation or the like so as to pressed toward the interior of the case 4. In a state where the corner portion of the case 4 is deformed in this manner, insertion of the guide pin into the gap formed by the corner portion of the case 4 and the can 2*a* during the picking operation performed by the picking mechanism 1 is obstructed. Accordingly, not only insertion of the guide pin provided in the second region 122B but also insertion the eight guide pins 11 provided respectively in the first regions 121 and second regions 122A into the gaps formed by the six cans 2 and either other cans positioned on the periphery thereof or the inner walls of the case 4 is obstructed. Hence, when the corner portion of the case 4 is deformed, it may be difficult to execute the picking operation performed by the picking mechanism 1.

Therefore, in the picking mechanism 1 according to this embodiment, as described above, a configuration in which guide pins are not provided in the four second regions 122B on the base member 12 is employed. Thus, when the six cans 2 placed near a corner portion of the case 4 are picked, as described above, a guide pin is not inserted into the gap formed by the corner portion of the case 4 and the can 2*a* during the picking operation. Hence, even if the corner portion of the case 4 is deformed, the occurrence of a situation in which the deformed part causes an obstruction when the eight guide pins 11 provided respectively in the first regions 121 and second regions 122A are inserted into the respective gaps during the picking operation can be suppressed.

Alternatively, when the picking mechanism 1 is configured such that guide pins are also provided in the second regions 122B on the base member 12 of the picking mechanism 1, the cans 2 are adjacent to these guide pins are also supported thereby. Thus, the picked cans 2 are also prevented from falling out by the guide pins provided in the second regions 122B. Note, however, that in this embodiment, as shown in FIG. 8, the minimum distance d2 between the two second guide pins 11*b* adjacent to the can 2*a* on the outside of the central axis of the can 2*a* is smaller than the outer diameter r of the can 2. By providing the two second guide pins 11*b* adjacent to the can 2*a* in this manner, the can 2*a* can be prevented from falling out of the picking mechanism 1 without providing a guide pin in the second region 122B. Note that this applies likewise to the two second guide pins 11*b* adjacent to each of the cans 2*c*, 2*d*, 2*f*.

Furthermore, in this embodiment, as shown in FIGS. 3 and 4, the part of each guide pin 11 near a tip end portion thereof has a sinker-like shape with a sectional area that gradually increases from the tip end portion side toward a base end portion side. Here, the base end portion of the guide pin 11 is the part of the guide pin 11 that is connected to the base member 12. Further, the tip end portion of the guide pin 11 is the end portion of the guide pin 11 on the opposite side to the base end portion. As shown in FIG. 10, during the picking operation performed by the picking mechanism 1, first, the guide pins 11 are inserted into the gaps formed by the six cans 2 and either other cans positioned on the periphery thereof or the inner walls of the case 4. At this time, the part of each guide pin 11 near the tip end portion thereof has the sinker-like shape described above, and therefore, as the guide pins 11 are inserted into the respective gaps, the guide pins 11 respectively come into contact with the side faces of the adjacent cans 2. As a result, the cans 2 adjacent to the respective guide pins 11 are positioned thereby. In other words, on the base member 12, the cans 2 are respectively guided to the positions of the corresponding adsorption pads 10, and the six cans 2 are arranged in two rows and three columns. Further, by forming the part of each guide pin 11 near the tip end portion thereof in the shape described above, the tip end portions of the guide pins 11 are easily inserted into the gaps during the picking operation performed by the picking mechanism 1. Accordingly, it is easy to guide the cans 2 using the guide pins 11 during the picking operation performed by the picking mechanism 1.

Second Embodiment

Figure 13:
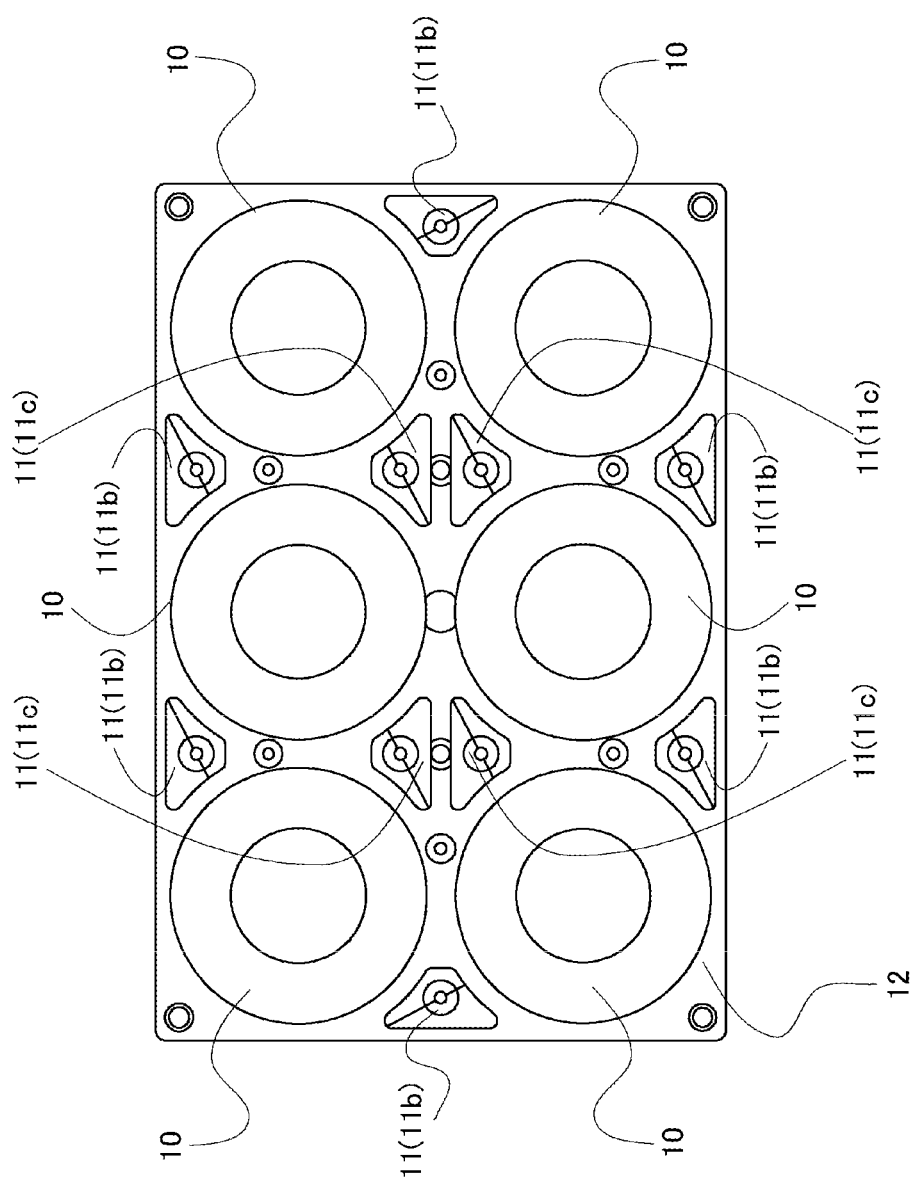
FIG. 13 is a view showing an arrangement of the six adsorption pads and ten guide pins on the base member.
Figure 14:
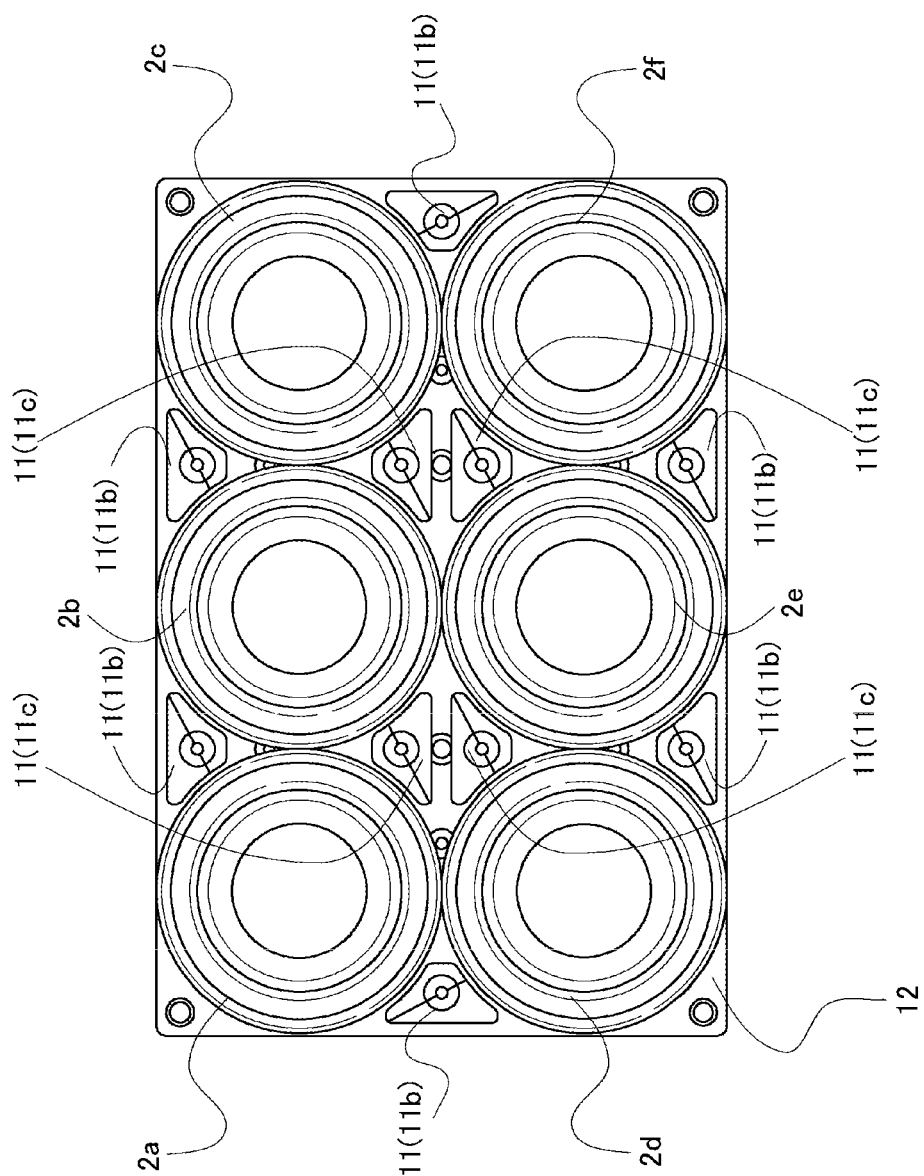
FIG. 14 is a view showing an arrangement of the ten guide pins and the six cans on the base member in a state where the six cans have been picked by the picking mechanism.

In this embodiment, the guide pins 11 of the picking mechanism 1 are configured differently to those of the first embodiment. FIG. 13 shows an arrangement of the six adsorption pads 10 and ten guide pins 11 on the base member 12. Further, FIG. 14 shows an arrangement of the ten guide pins 11 and the six cans 2 on the base member 12 in a state where the six cans 2 have been picked by the picking mechanism 1. As shown in FIG. 13, similarly to the first embodiment, the six adsorption pads 10 are provided on the base member 12 at equal intervals in two rows and three columns. Further, in this embodiment, the first region 121 and the second regions 122A, 122B on the base member 12 are defined similarly to the first embodiment. In other words, the first region 121 and the second regions 122A, 122B on the base member 12 are defined as the regions shown in FIG. 7.

Furthermore, as shown in FIGS. 13 and 14, in this embodiment, similarly to the first embodiment, one second guide pin 11b is provided on the base member 12 in each second region 122A. The configuration and arrangement of the second guide pins 11b are similar to the configuration and arrangement of the second guide pins 11b according to the first embodiment. Moreover, likewise in this embodiment, guide pins are not provided on the base member 12 in the second regions 122B of FIG. 7. This embodiment differs from the configuration of the first embodiment, meanwhile, in that two guide pins 11 are provided on the base member 12 in each first region 121. The guide pins 11 provided in the first regions 121 will also be referred to hereafter as first guide pins 11c. The first guide pin 11c has an identical shape to the second guide pin 11b. The first guide pins 11c are arranged in the first region 121 such that side faces of the respective first guide pins 11c, which are formed in a curved surface shape so as to extend along the side faces of the cans 2, oppose the cans 2 adjacent thereto.

Here, the configuration and arrangement of the first guide pins 11c according to this embodiment will be described in detail. In this embodiment, as shown in FIG. 14, when the six cans 2 are picked by the picking mechanism 1, the first guide pins 11c are each provided on the base member 12 so as to be adjacent to two cans 2. Note that likewise in this embodiment, similarly to the first embodiment, the distance L on the base member 12 between the central axis of each can 2 and the side face of each adjacent guide pin 11 is slightly larger than half the outer diameter r of the can 2 (note that the distance L and the outer diameter r are not shown in FIG. 14). Hence, with the configuration according to this embodiment, similarly to the first embodiment, the cans 2 are respectively guided to the positions of the corresponding adsorption pads 10 by the guide pins 11 adjacent thereto. Accordingly, when the six cans 2 are picked by the picking mechanism 1, the cans 2 are held by the adsorption pads 10 and supported by the guide pins 11 while arranged on the base member 12 in two rows and three columns and such that the side faces of adjacent cans 2 contact each other.

Furthermore, when the cans 2 come into contact with the side faces of the guide pins 11, the cans 2 are supported by the guide pins 11. Similarly to the first embodiment, therefore, even when force acts on the cans 2 in a different direction to the axial direction of the cans 2, since the guide pins 11 contact the side faces of the cans 2, the cans 2 can be prevented from becoming detached from the adsorption pads 10. Hence, with the configuration according to this embodiment, similarly to the first embodiment, the six cans 2 can be picked by the picking mechanism 1 with stability.

Moreover, as described above, the first guide pins 11c are each provided on the base member 12 so as to be adjacent to two cans 2. Therefore, when the six cans 2 are picked by the picking mechanism 1, the two first guide pins 11c provided in each first region 121 each contact two cans 2. In other words, each of the two first guide pins 11c provided in each first region 121 has two cans 2 as support subjects. Furthermore, similarly to the first embodiment, when the six cans 2 are picked by the picking mechanism 1, the second guide pins 11b provided in the second regions 122A each contact two cans 2. In other words, each of the two second guide pins 11b likewise has two cans 2 as support subjects.

Here, in a state where the six cans 2 have been picked by the picking mechanism 1, the first regions 121 are each surrounded by four cans 2. Accordingly, the guide pins 11 provided in each first region 121 are required as a whole to support four cans 2. In this embodiment, therefore, a configuration in which two first guide pins 11c, each having two cans 2 as support subjects, are provided in each first region 121 is employed. According to this configuration, four cans 2 can be supported by the two first guide pins 11c. Further, the number of cans 2 (four) supported by the two first guide pins 11c provided in each first region 121 as a whole is larger than the number of cans 2 (two) supported by the single second guide pin 11b provided in each second region 122A. Therefore, the two first guide pins 11c provided in the first region 121 as a whole require greater durability than the single second guide pin 11b provided in the second region.

In consideration of this problem, in this embodiment, the first guide pin 11c and the second guide pin 11b are shaped identically. Accordingly, a total sectional area of the parts of the two first guide pins 11c provided in each first region 121 that contact the side faces of the cans 2 is double the sectional area of the parts of the single second guide pin 11b provided in each second region 122A that contact the side faces of the cans 2. In other words, the total sectional area of the parts of the two first guide pins 11c provided in each first region 121 that contact the side faces of the cans 2 is larger than the sectional area of the parts of the single second guide pin 11b provided in each second region 122A that contact the side faces of the cans 2. Note that "the total sectional area of the parts of the two first guide pins 11c that contact the side faces of the cans 2" denotes the sum of the surface areas of the parts of the two first guide pins 11c that contact the side faces of the cans 2 on a cross-section that is perpendicular to the axial direction thereof.

According to this configuration, the total sectional area of the parts of the two first guide pins 11c supporting four cans 2 as a whole that contact the side faces of the cans 2 is larger than the sectional area of the parts of the second guide pin 11b supporting two cans 2 that contact the side faces of the cans 2. Thus, the durability of the two first guide pins 11c provided in the first region 121 can be made greater than the durability of the single second guide pin 11b provided in the second region. As a result, durability can be secured in each of the guide pins 11.

Furthermore, as described above, in a state where the six cans 2 have been picked by the picking mechanism 1, the two first guide pins 11c provided in each first region 121 each support two cans 2. Moreover, the second guide pin 11b provided in each second region 122A supports two cans 2. Hence, the durability required of one first guide pin 11c and one second guide pin 11b is the same. In this embodiment, therefore, identically shaped guide pins are employed as the first guide pins 11c and the second guide pins 11b. In so doing, the components of the picking mechanism 1 can be standardized. However, the guide pins provided in the first regions 121 and the second regions 122A may respectively have different shapes. Furthermore, in this embodiment, two guide pins 11 are provided in each first region 121 and one guide pin 11 is provided in each second region 122A, but the numbers of guide pins are not limited thereto. For example, four guide pins may be provided in each first region 121. Further, two guide pins may be provided in each second region 122A. Note, however, that likewise in this case, the guide pins are provided such that the total sectional area of the parts of the guide pins provided in each first region 121 that contact the side faces of the cans 2 is larger than the total sectional area of the parts of the guide pins provided in each second region 122A that contact the side faces of the cans 2. In so doing, durability can be secured in each guide pin.

Furthermore, in the first and second embodiments, the picking mechanism 1 picks six cans 2 simultaneously, but the number of cans 2 picked simultaneously does not necessarily have to be six, provided that the number of picked cans 2 is at least four. For example, the number of picked cans 2 may be eight or nine.

REFERENCE SIGNS LIST

1 Picking mechanism
10 Adsorption pad
11 Guide pin
12 Base member
120 Virtual rectangle
121 First region
122 Second region
2 Can
21 Projection
3 Robot arm
31 Arm mechanism
32 Support portion
4 Case

The invention claimed is:

1. A picking mechanism for picking a plurality of objects constituted by four or more columnar objects, the picking mechanism comprising:
a base member;
a holding member provided on the base member in a plurality so as to respectively hold upper face portions of the objects or parts thereof near the upper face portions; and
a guide member provided on the base member in a plurality so as to respectively guide the objects to positions of the holding members and support the objects by contacting side faces of the objects,
whereby, when the plurality of objects have been picked, the objects are respectively held by the holding members and supported by the guide members while arranged on the base member in a plurality of rows,
wherein, when regions of the base member that are each surrounded by circumferences of four circles serving as projections of four objects arranged in two rows, among the plurality of objects, in a case where the plurality of objects in a picked state are projected onto the base member in an axial direction thereof are set as first regions, and
regions of the base member that are each surrounded by any one or two sides of a virtual rectangle, the virtual rectangle being formed so as to surround all of a plurality of circles serving as the projections of all of the plurality of objects while contacting the circumferences of the plurality of circles, and the circumferences of any one or two of the plurality of circles in a case where the plurality of objects in the picked state are projected onto the base member in the axial direction thereof are set as second regions,
the guide members are respectively provided in the first regions of the base member and regions excluding a region, among the second regions on the base member, that is surrounded by any two sides of the virtual rectangle and the circumference of any one of the plurality of circles,
a total sectional area of parts of the guide member provided in one of the first regions that contact the side faces of the objects is larger than a total sectional area of parts of the guide member provided in one of the second regions that contact the side faces of the objects, and
the guide member is not provided in the region, among the second regions on the base member, that is surrounded by any two sides of the virtual rectangle and the circumference of any one of the plurality of circles.

2. The picking mechanism according to claim 1, wherein at least a part of the guide member near a tip end portion thereof has a sinker-like shape with a sectional area that gradually increases from the tip end portion side toward a base end portion side.

3. A robot arm comprising:
the picking mechanism according to claim 1; and
an arm mechanism having a tip end portion to which the picking mechanism is connected.

* * * * *